United States Patent
Pienta et al.

(10) Patent No.: US 7,317,970 B2
(45) Date of Patent: Jan. 8, 2008

(54) REMOTE SENSING FOR BUILDING AUTOMATION

(75) Inventors: William Thomas Pienta, Prospect Heights, IL (US); Scott Harvey, Crystal Lake, IL (US); Michael Hjelm, Hoffman Estate, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 11/456,886

(22) Filed: Jul. 12, 2006

(65) Prior Publication Data

US 2007/0208460 A1 Sep. 6, 2007

Related U.S. Application Data

(60) Provisional application No. 60/778,343, filed on Mar. 2, 2006.

(51) Int. Cl.
*G01M 1/38* (2006.01)
(52) U.S. Cl. .................... 700/278; 236/91 D; 236/91 F
(58) Field of Classification Search .................. 700/90, 700/276–278; 356/614; 236/91 D, 91 F; 219/121.83, 121.65
See application file for complete search history.

(56) References Cited

U.S. PATENT DOCUMENTS

| | | | |
|---|---|---|---|
| 6,449,533 B1 * | 9/2002 | Mueller et al. ............. | 700/276 |
| 6,815,636 B2 * | 11/2004 | Chung et al. ............ | 219/121.65 |
| 7,006,236 B2 | 2/2006 | Tomasi et al. | |
| 2004/0008651 A1 | 1/2004 | Ahmed | |
| 2004/0200816 A1 * | 10/2004 | Chung et al. ............ | 219/121.83 |
| 2005/0090915 A1 * | 4/2005 | Geiwitz ....................... | 700/90 |
| 2005/0252984 A1 | 11/2005 | Ahmed | |

OTHER PUBLICATIONS

The Virtual Laser Keyboard Website, virtual-laser-keyboard.com, pp. 1-4, printed Jan. 16, 2006.
The Virtual Laser Keyboard Website, virtual-laser-keyboard.com/products.asp, pp. 1-4, printed Jan. 16, 2006.
The Virtual Laser Keyboard Website, virtual-laser-keyboard.com/f-a-q.asp, pp. 1-6, printed Jan. 16, 2006.

* cited by examiner

*Primary Examiner*—Leo Picard
*Assistant Examiner*—Douglas S Lee

(57) ABSTRACT

A line of sight temperature sensor in a thermostat allows placement at locations other than on a wall. For example, the thermostat is positioned in a ceiling, allowing easier wiring access. Wall placement may be used. By remotely sensing user selection associated with a remote location, control of the building automation is provided without requiring user contact. For example, the user places a finger or hand on a graphic for increasing or decreasing temperature set point. The placement is detected with an optical or other remote sensor. The set point for heating or cooling control is altered based on the remote sensing of the user selection.

30 Claims, 3 Drawing Sheets

REMOTE SENSING FOR BUILDING AUTOMATION

RELATED APPLICATIONS

The present patent document claims the benefit of the filing date under 35 U.S.C. §119(e) of Provisional U.S. Patent Application Ser. No. 60/778,343, filed Mar. 2, 2006, which is hereby incorporated by reference.

BACKGROUND

The present embodiments relate to remote sensing for building automation. Building automation devices are positioned throughout a building. For example, a temperature sensor (i.e., thermostat) is positioned on a wall in a room, and a corresponding actuator is positioned above a ceiling for controlling airflow, heating or cooling. As another example, a motion sensor is positioned on a ceiling for actuating a light controlled by a ballast balance above the ceiling. Security, fire, heating, ventilation, air conditioning (HVAC) or other networks of devices automate building control.

Some devices are provided for user interaction. For example, the thermostat includes a dial, button, switch or other user input devices for setting a temperature set point. As another example, a computer controller includes a user interface for setting temperature set points for one or more thermostats or associated actuators. Using the temperature set point, the heating or cooling for the room or other building area is based on the temperature sensed by the thermostat.

To sense the temperature in a room, the thermostat is typically mounted to a wall in the room. Mounting the thermostat on a wall may require expensive and difficult routing wires through the wall. In some building environments, such as hospitals or museums, a thermostat on the wall may not be desired. Similarly, other controls, such as lighting or volume controls, may require undesired or costly mounting on a wall.

BRIEF SUMMARY

By way of introduction, the preferred embodiments described below include methods, systems and improvements for thermostats and/or control of building automation. A line of sight temperature sensor in a thermostat allows placement at locations other than on a wall. For example, the thermostat is positioned in a ceiling, allowing easier wiring access. Wall placement may be used. By remotely sensing user selection associated with a remote location, control of the building automation is provided without requiring user contact. For example, the user places a finger or hand on a graphic for increasing or decreasing temperature. The placement is detected with an optical or other remote sensor. The set point for heating or cooling control is altered based on the remote sensing of the user selection. The line of sight temperature sensing or the building automation user selection sensing may be used independently or together.

In a first aspect, a thermostat of a building automation system is for controlling heating or air conditioning in a room of a building. An improvement of the thermostat includes a line of sight temperature sensor operable to sense a temperature within the room and spaced from the thermostat.

In a second aspect, a method is provided for sensing temperature for automated building heating or air conditioning. A temperature is sensed with a line of sight temperature sensor. Heating or air conditioning is controlled in a building automatically as a function of the temperature.

In a third aspect, a user input device is provided for building automation. A sensor is operable to detect user interaction with a location spaced from the user input device. A processor is operable to determine input selection as a function of the detected user interaction with the location and operable to generate output data for building automation as a function of the input selection.

In a fourth aspect, a method is provided for inputting information in building automation. A sensor senses user interaction with a location spaced from the sensor. Input selection is determined as a function of the sensed user interaction with the location. Output data for building automation is output as a function of the input information.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A virtual wall thermostat with remote sensing of user selection may allow more versatile placement of the thermostat. For example, the thermostat mounts in a ceiling. The thermostat operates by projecting thermostat symbols onto an adjacent wall, sensing human interaction with these symbols, and measuring room temperature with a line of sight temperature sensor. In one embodiment, room temperature is sensed by an infrared sensor aimed by the user at a location deemed to be representative of the room temperature. Alphanumeric and control panel symbols are projected on the wall using an array of laser diodes. Other information may be projected, such as light controls, time or announcements. A CMOS image sensor detects the presence and location of human fingers touching or near the control panel images on the wall. The building automation, such as setting a temperature set point, is controlled based on the detected user selections of the symbols. Password protection based on user selections of symbol combinations may be incorporated to prevent unauthorized changes of settings.

By allowing placement of the thermostat in the ceiling, wall or other location, field labor may be reduced. Since occupants cannot touch the thermostat, the thermostat is less likely to be damaged. Where installation of a physical device is not preferred or looks "ugly," such as at museums, art galleries, or rooms that must be washed down, the versatile placement or less intrusive design may be more appealing. In rooms where wiring runs are difficult, such as foyers with very high ceilings, glass enclosed rooms, or stone walls, versatile placement may be desired or ease installation.

Figure 1:
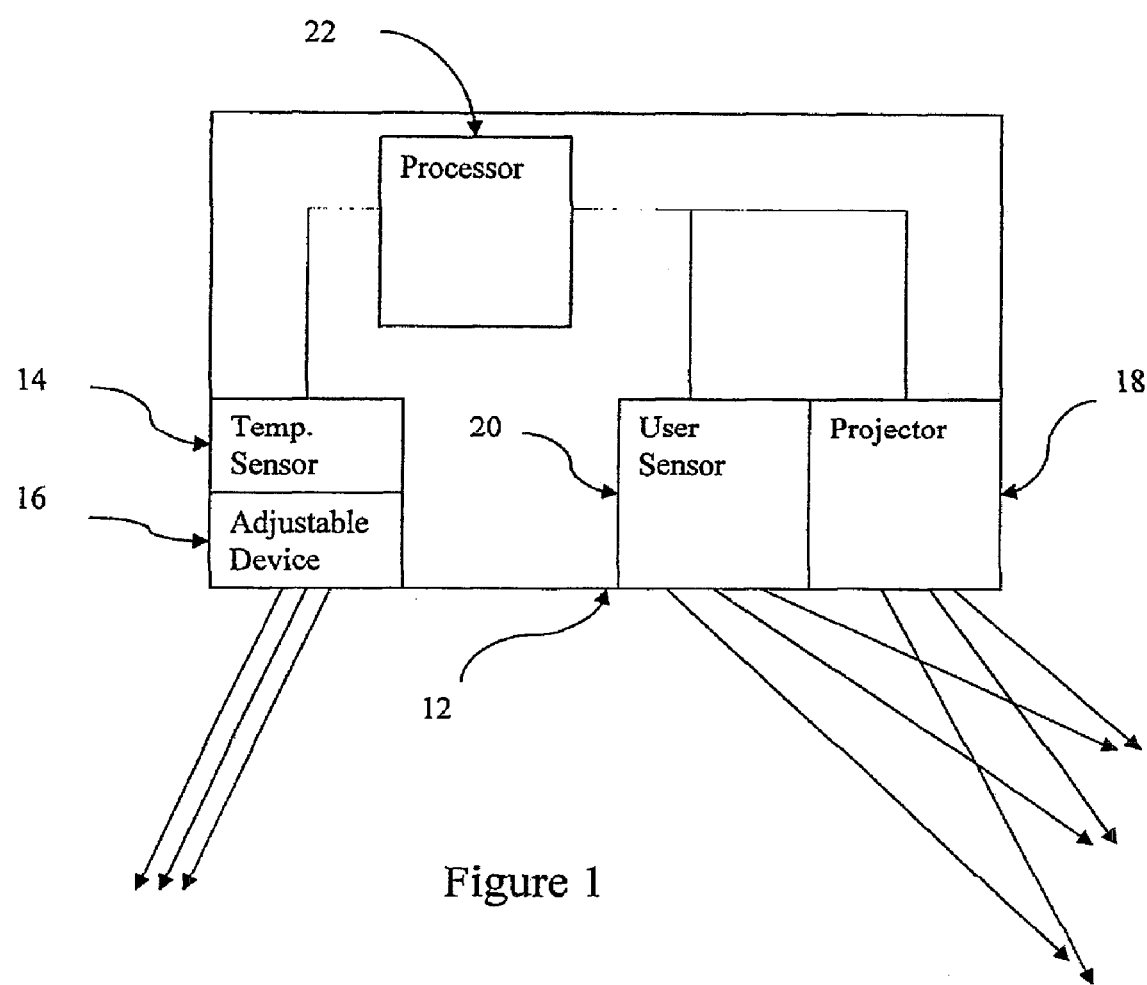
FIG. 1 is a block diagram of one embodiment of a virtual thermostat and virtual controller.

FIG. 1 shows one embodiment of a device 12 for building automation. For example, the device 12 is associated with a sensor, actuator and/or controller in a network of devices for automating fire, security, heating, ventilation, cooling, lighting, communications, or other building automation. The device 12 is part of a network of components, such as being a thermostat in one room of a HVAC automated building. The network may be for residential, commercial, high-rise, low rise, convention, museum, gallery, hospital, medical or other types of buildings. The network is for a single room or a plurality of rooms. One or more devices 12 are provided in the network or in a room. For example, as a thermostat, one of the devices 12 is provided in every zone, such as every room or group of rooms. The device 12 interacts with an actuator and/or controller for altering HVAC for the room based on the sensed temperature and temperature set point. As another example, the device 12 as a thermostat communicates with another one of the devices 12 operating as a user input. In another example, a wall-mounted thermostat without a remote sensing capability communicates with the device 12 in the room acting as a user input alone or with an actuator or controller.

In one embodiment, the building automation system is one of the systems disclosed in U.S. Patent Publication Nos. 2005/0252984 or 2004/0008651, which are incorporated by reference herein. Other building automation systems may be used, such as entirely wired, partially wireless or entirely wireless systems. The device 12 may be incorporated into any of the components of the building automation system or may operate as a stand-alone or separate component.

In the embodiment shown, the device is for user input and a thermostat. In other embodiments, the device 12 is only for user input without being a thermostat or is only a thermostat without being for user input. As a thermostat, the device is part of a control for heating or air conditioning in a room or other location of a building.

The device 12 of FIG. 1 includes a temperature sensor 14, an adjustment device 16, a projector 18, a user sensor 20 and a processor 22. Additional, different or fewer components may be provided. For example, the temperature sensor 14 with or without any combination of one or more of the other components is provided. As another example, the user sensor 20 with or without any combination of one or more of the other components is provided.

The components of the device 12 are included in or on a same housing. For example, a metallic or plastic box at least partially encloses the components. A lens, opening or other window are provided for the temperature sensor 14, projector 18 and/or user sensor 20. One of the components may mount to an outside of the housing. In one embodiment, a face plate with windows fits flush with or extends down from a ceiling mount of the reminder of the housing. In other embodiments, different housings or separate housings for separate components are provided. Alternatively, a mount or mounts without a housing are used.

The temperature sensor 14 is a line of sight temperature sensor. For example, the temperature sensor 14 is an infrared device with a line of sight for measuring remote temperatures. Other temperature sensors for measuring at a remote location along a line of sight may be used, such as temperature sensors operable at other frequencies or based on other types of energy (e.g., ultrasound). The line of sight is collimated, divergent or convergent. More than one temperature sensor 14 may be used.

Figure 2:
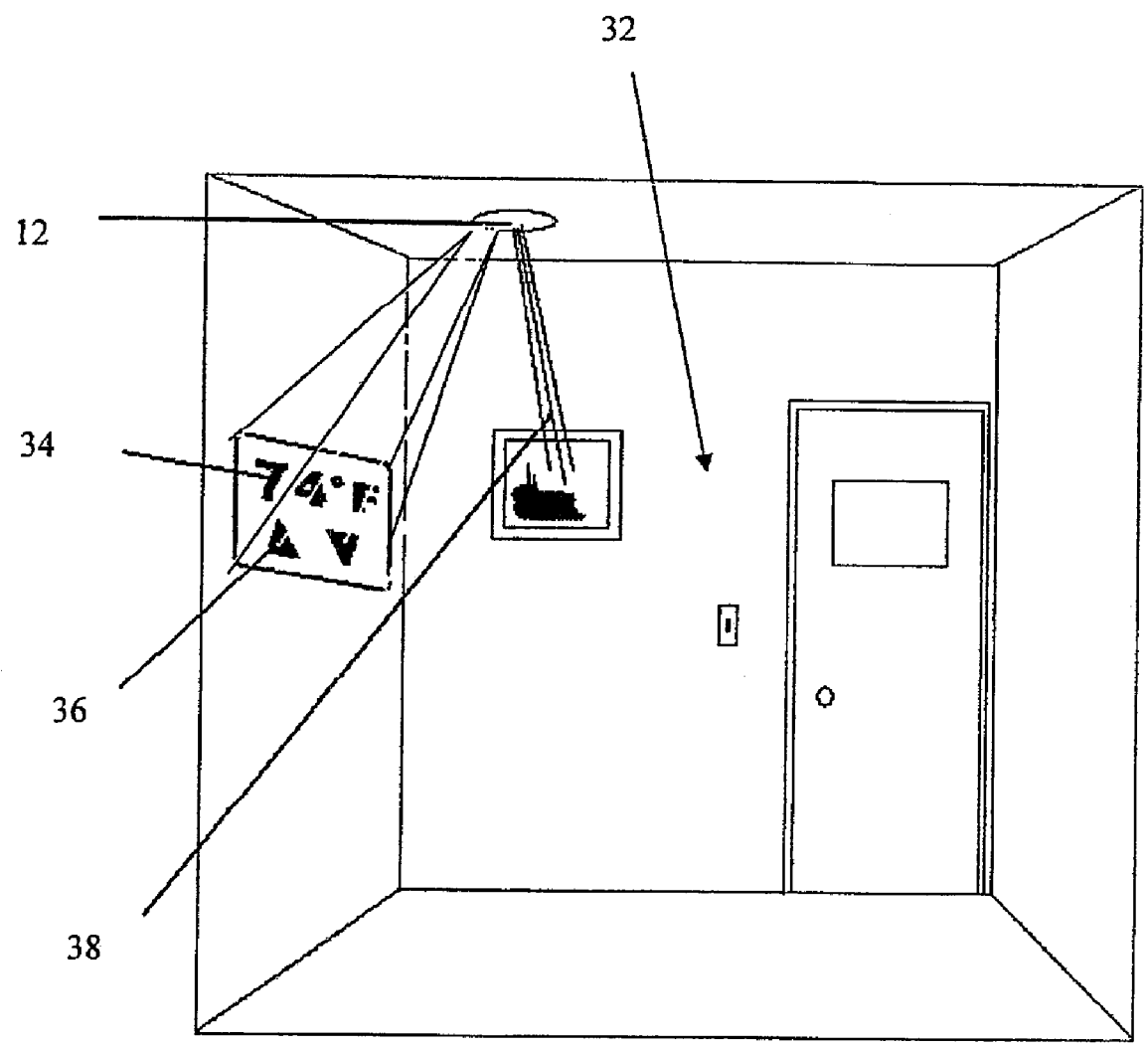
FIG. 2 is a graphical representation of the positioning of the thermostat and virtual controller of FIG. 1 in a room according to one embodiment.

The temperature sensor 14 senses a temperature within a room at a location spaced from the thermostat device 12 or from the line of sight temperature sensor 14. For example, the line of sight temperature sensor 14 is positioned in a ceiling for sensing a temperature of a wall, floor, piece of furniture, or other object in the room. The sensor 14 senses the temperature of an area in the room (section of wall, piece of furniture etc.) deemed by the user to be representative of the temperature of the whole room. Since wall temperature may be influenced by exterior temperature or temperatures outside of the room, a wall hung picture or other object or locations spaced from the wall may be used. FIG. 2 shows the device 12 with a line of sight 38 of the temperature sensor 14 directed to a picture on a wall in the room 32.

The adjustable device 16 (FIG. 1) guides the line of sight 38 (FIG. 2) to the desired location. The adjustable device 16 may guide transmissions from other devices alternatively or additionally, such as the projector 18 and/or the user sensor 20. The transmissions are guided to a same, overlapping or different locations.

The adjustable device 16 is a lens, reflector, mirror, mount or other device for moving the temperature sensor 14 or the directing the line of sight 38. The adjustable device 16 may be accessible at any time or may be covered by a faceplate to limit access. By altering or changing the adjustable device 16, the region of the room for which temperature is sensed may be altered. The adjustable device 16 may allow for altering an amount of divergence or convergence to sense temperature for larger or smaller regions. The adjustments are manual, but may be automated with a motor or other force-applying device. In alternative embodiments, the adjustable device 16 is not provided and the line of sight 38 extends in a predetermined or mount determined direction. In other alternative embodiments, the temperature sensor 14 senses a temperature at the sensor.

The projector 18 is a laser diode, a laser diode projection system, an LCD, a light source, optical projector, light pipe, or other projector of patterned visible light. In one embodiment, the projector 18 is a projector disclosed in U.S. Pat. No. 7,006,236, the disclosure of which is incorporated herein, or other projector used for user input functions, such as a projector for a virtual keyboard. The pattern may be a dot, line, shape, symbol or group of symbols or shapes. For example, the projector 18 projects a graphic on or adjacent to a location. The graphic corresponds to a building automation function, such as projecting temperature related information (e.g., current temperature, temperature up, temperature down, or temperature set controls) onto a surface spaced from the thermostat. The graphic may be alpha-numeric, symbols or other pattern, such as up and down arrows. The graphic may emulate a controller for operating a thermostat, light switch, volume control, or other building automation control. The graphic may be fixed or programmable, such as allowing for different temperatures or other information to be displayed.

The projector 18 has a fixed or adjustable orientation and amount of collimation. For example, the adjustable device 16 or a similar device operates for steering the projection 34, 36 (FIG. 2) onto a desired area of the wall, floor, ceiling or other object. The projection is directed at a same or different location than the line of sight temperature sensor 14. The angle of incidence may be assumed or input to control the projected graphic to account for proximity differences. For example, greater angles of incidence provide for lesser differences in relative size from top to bottom of the graphic.

The relative size is adjusted to account for angle of incidence. Alternatively, the distortion due to difference in distances is acceptable or not avoided.

In an alternative embodiment, the projector 18 is not provided. User knowledge or a template placed on a surface is provided. For a template, paint, plastic or other overlay provides the graphics.

The user sensor 20 and the processor 22 detect user interaction with a location spaced from the device 12 or spaced from the user sensor 20. The user sensor 20 is an optical sensor, an image sensor, a CCD sensor, a CMOS sensor, a camera, an electric field sensor, a capacitance sensor or other sensor for detecting an object near a specific location or a plurality of locations. The user sensor 20 is focused on a desired location, such as being focused on the graphics of controls provided by the projector 18 on a desired area of the wall. The processor 22, based on input from the user sensor 20, detects human fingers, hands or other objects in the area of these controls to initiate the action related to the symbol or button being selected by the user.

In one embodiment, the user sensor 20 operates without depth perception and assumes proper depth. For example, the angle of the user sensor 20 to the graphics is such that interference is likely to be based on user selection. The location associated with stopped or changing motion relative to the graphics is determined as selection of the graphic at that location without accounting for depth.

In an alternative embodiment, stereoscopic imaging is used. The user sensor 20 includes a plurality of sensors at different positions for depth perception.

In another embodiment, the user sensor 20 includes one or more projectors creating a plane of light or energy just above (e.g., millimeters or centimeters above) the graphics. The light is at a frequency not visible to humans, but may be at visible wavelengths. When the user positions an object into the plane, the light or energy is reflected to the user sensor 20. The location of the reflection is determined as the user selected location. Structured light or energy may be used, and the location determined based on the size and shape of the light or energy pattern formed on the user or object intersecting the light or energy. The reflection is filtered and imaged. In one embodiment, the user sensor disclosed in U.S. Pat. No. 7,006,236, the disclosure of which is incorporated herein by reference, is used. Other virtual user input sensors may be used.

The device 12 may be positioned in the ceiling, but near a wall, to generate the plane. The projector 18 and/or user sensor 20 have a greater, but low, angle of incidence to the wall. Alternatively, the infrared laser diode or other light source is positioned to form the plane adjacent to the wall, and the device 12 is spaced from the wall.

The processor 22 is a general processor, controller, digital signal processor, application specific integrated circuit, field programmable gate array, analog circuit, digital circuit or combinations thereof. The processor 22 controls the line of sight temperature sensor 14, the adjustable device 16, the projector 18 and/or the user sensor 20. The processor 22 may implement functions of the components, such as image processing data output by the user sensor 20 to determine locations associated with user selection. The processor 22 may include a plurality of the same or different devices for parallel or sequential processing. The processor 22 is part of, separate from but in a same housing, or spaced from one or more of the components of the device 12.

In one embodiment, the processor 22 determines the location of user selection. Image data is processed to determine a location relative to graphics or control selections being contacted or activated. The location may be used for one or more purposes. For example, the device 12 operates with the projector 18 in a standby or off mode. In response to detecting a user or object in the field of view of the user sensor 20, the projector 18 is turned-on by the processor 22. As another example, the processor 22 determines a sequence of user selections or a particular configuration of one or more hands (e.g., which fingers are extended) or other objects. The sequence or image information is used to determine user authorization for further input. If the user is authorized, the processor 22 outputs building automation data to control the processor 22, other components of the device 12 or other devices.

For a thermostat, the processor 22 determines a temperature, temperature difference, or other temperature information based on the outputs of the temperature sensor 14. The processor 22 uses a look-up table, function calculation or other processing to determine the temperature information. In one embodiment, the processor 22 calculates an average of signals provided from or results based on the line of sight temperature sensor 14. The processor 22 may control whether a heating or cooling should be turned on, increased or decreased. For example, the processor 22 compares output of the temperature sensor 14 to a temperature to a set point. Based on the comparison, output data controls the building automation.

The processor 22 controls the thermostat as a function of the temperature and detected user interaction. For example, the user may select a graphic associated with increasing or decreasing a temperature set point. By determining the placement of an object or finger adjacent a graphic, the building automation is controlled. The user selection of a temperature set point graphic may result in the projector 18 switching graphics to indicate a current set point temperature with or without a current sensed temperature.

The processor 22 outputs output data for any building automation function based on the user selections. Different graphics and/or associated locations may be used for controlling different functions. Building automation functions are responsive to output data, such as temperature set point data, light control data, intercom control data, volume control data or combinations thereof. The output data may be output within the device 12 for operation of components in the device 12 or output from the device 12 for operation of other devices. The output data includes commands, codes or information for controlling or use by other devices.

The user sensor 20 may also or instead replace conventional wall-mounted light switch, dimmer and/or other wall mounted or building automation controls. The user sensor 20 may replace intercom controls, or volume controls for ceiling mounted or other PA/music speakers. By consolidating controls, less wiring and fewer control devices may be needed. The projector 18 may be used for real-time informational displays. Such real time informational displays can include information about the environmental conditions in the room, information about emergencies in a building, news, or other information.

Figure 3:
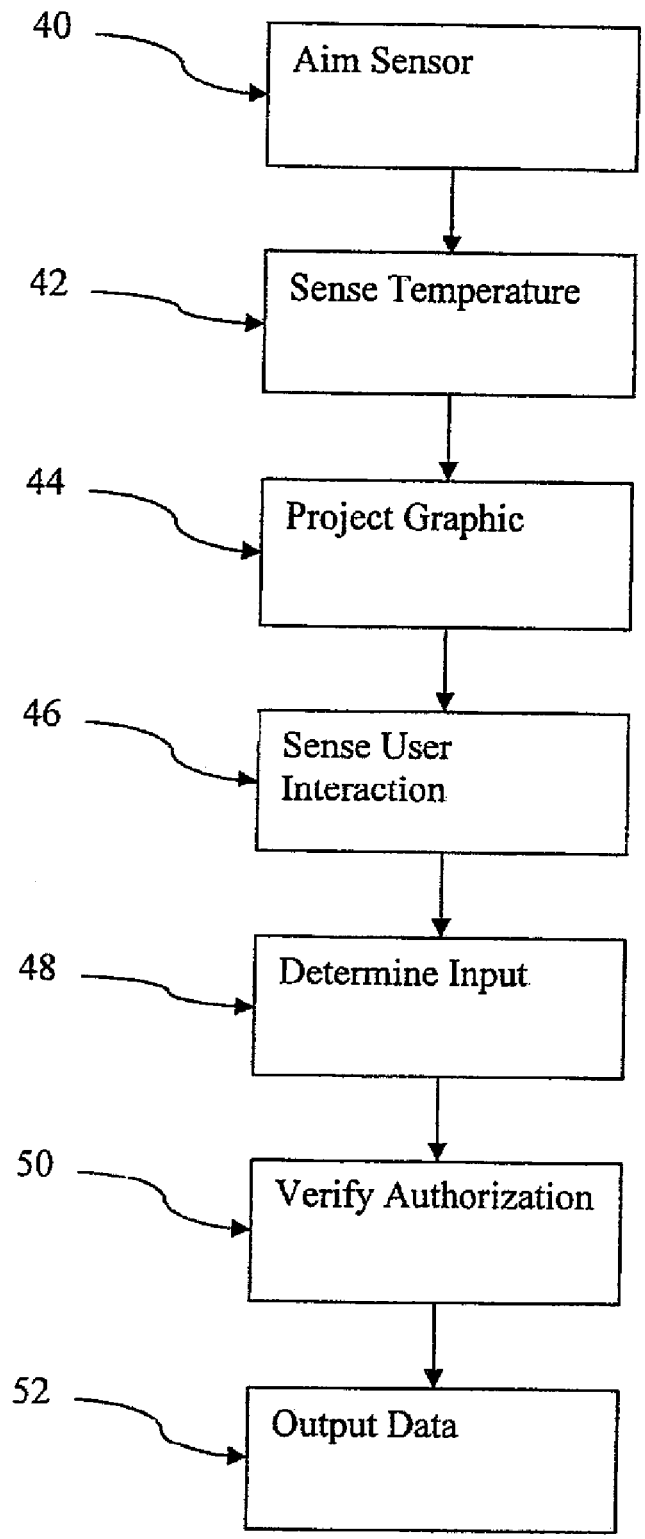
FIG. 3 is a flow chart diagram of one embodiment of a method for controlling temperature and determining user selection for building automation.

FIG. 3 shows a method for sensing temperature for automated building heating or air conditioning, and/or for inputting information in building automation. The method may include different, fewer or additional acts. For example, acts 40, 42 and 52 are provided without the other acts (i.e., a method is provided for sensing temperature). As another example, acts 46, 48 and 52 are provided with or without the projection act 44 and without other acts (i.e., a method is provided for user input). The acts are performed in the order shown or a different order. The acts are performed with the device 12 of FIG. 1 or different equipment.

In act 40, a line of sight of the line of sight temperature sensor is aimed at an object in a room of the building. The object is a wall, floor, ceiling, furniture, picture, painting or other object. The line of sight is aimed by mounting and/or rotating the device 12. The device 12 is mounted in the wall, ceiling, floor or an object in the room. The device 12 may be positioned without mounting, such as resting on a floor. The location of the position or mounting with or without any rotation of the device 12 aims the line of sight. Alternatively or additionally, the adjustable device 16 is rotated or adjusted to aim the line of sight. The line of sight is aimed by redirection (e.g., a mirror) or by repositioning the temperature sensor 14. The line of sight may be aimed by increasing or decreasing an amount of collimation.

In act 42, the temperature is sensed with the line of sight temperature sensor 14. The temperature sensed is the temperature of the surface to which the line of sight was aimed. The surface is an even or uneven surface within a room. The infrared energy radiated by the surface is sensed without reflection, so the surface may have various angles relative to the line of sight. In alternative embodiments, the surface is substantially normal to the line of sight for reflection based temperature measurements, such as temperature based on propagation time of acoustic energy. Since the surface is within the room, but spaced away from the temperature sensor 14, the temperature at a location remote from the device 12 is determined.

A single measurement is used. Alternatively, a plurality of temperature measurements, determined temperatures, temperature differences or other temperature information is combined. For example, measurements are averaged. The temperature may be sensed continuously, in response to a trigger, or periodically.

In act 44, a graphic is projected on or adjacent to a point or area. The graphic is at the same, overlapping or different location than the surface area for temperature sensing. The projection may be aimed or set based on mounting. In one embodiment, the projector 18 is aimed to project the graphic at an otherwise blank wall area, such as near or on a door. The projection provides a graphic portion of a user interface spaced away from the projector 18 or thermostat. In one embodiment, the graphic is projected onto a panel. The panel is fastened to (e.g., glued), formed on or connected with the wall to display the projected graphic. For example, the wall may be glass. A panel, such as a film or sheet, is used to impede the light and display the graphic. A glass or other transparent wall may be treated (e.g., etching the glass to achieve a mat surface or painting an area on the glass or wall with a special paint) to form the panel. In other embodiments, the area is sufficiently opaque to display the projected graphic.

The graphic corresponds to a building automation function. The graphic is for input controls, current information and/or other data. For example, the graphic is a temperature set point (e.g., 72°) and temperature adjustment controls (e.g., arrows or labeled buttons). Other temperature related information may include a currently sensed temperature, set points by time of day, set points by day of week or other temporal or spatial considerations for thermostat operation. Other building automation functions include security, fire, lighting, audio, heating or cooling functions. For example, security or fire warnings and instructions are projected. Maps or guidance information may be projected. Technician related information, such as device testing information, may be projected. Lighting switches or dimming controls may be projected. Audio volume or switching may be projected. The projector 18 may project combinations of information from different building automation functions.

As an alternative or in addition to projection, a template may be positioned on a surface, such as placing a clear plastic overlay with raised or included graphic information on a wall. Hand signals, body position, written symbols (e.g., handwritten temperature with an activation symbol) or other information may be used without any graphic.

In act 46, user interaction with the graphic is sensed. The interaction is positioning of a part of the user or another object relative or adjacent to the graphic. The graphic is or is not touched. Since the device 12 and the user sensor 20 are spaced from the graphic, the user interaction is sensed remotely.

The user interaction is sensed optically in one embodiment. A picture or image of the graphic or associated area is used to determine the interaction. Other remote user sensing may be used, such as radar, infrared, ultrasound, capacitive, and/or electric field sensing.

User selection may be indicated by a tapping or hovering by the desired control. The change in motion (e.g., change of direction) or steady motion indicates user selection of the control function associated with the graphic. Where the graphic includes more than one control function, the location of the user selection determines the appropriate input or building function change.

In act 48, input information is determined as a function of the sensed user interaction with the graphic locations. Image processing identifies the user or object and position relative to the graphic. The position of the graphic is assumed, known or determined from the image. Based on a given position or position as a function of time, a user selection associated with the graphic is determined. Alternatively, a location of interference is determined, such as identifying column and row where light or other energy is being blocked in a matrix sensor. Other pattern or signal recognition to determine user selection may be used.

The user selection and corresponding graphic indicate the input. For example, if a user selects an up arrow associated with the temperature set point, an increase in the temperature set point is determined. A look-up table, calculation or programmed relationship relates a given graphic or location for a given displayed graphic to desired input information. In alternative embodiments, the graphics are projected without user sensing for control.

In act 50, the determined input may correspond to verifying user authorization as a function of the input information. A sequence of graphics is compared to a pass code sequence. If the sequences are the same, further input may be accepted. If the sequences are not the same, the acceptable input is limited to certain functions or no further input is accepted other than authorization inputs. Alternatively, no pass code protection is provided.

In act 52, output data for building automation is output as a function of the input information. The input information determined by user sensing is output as output data to control or communicate information. The input information may be converted or formatted to form output data. The output data is for communication or to control of external devices. Output data may be output to other functions performed by a same device or output to other devices.

In one embodiment, the output data is an actuator control signal, a temperature difference, a temperature, or other data allowing determination of temperature. A controller or processor associated with the actuator receives the output data and increases, decreases or maintains a current level of actuation. Heating or air conditioning in a building is controlled automatically as a function of the temperature.

Output information associated with a set point may be used within the thermostat for continuous or periodic monitoring. Alternatively, the set point information is provided to a controller or actuator device for comparison with received temperature information. Heating or air conditioning is controlled as a function of the temperature and the user interaction with the graphic location to set the set point. An operation point of a thermostat is set as a function of the positioning of the object adjacent the input graphic. The operation point is communicated to the desired devices for operation of the building automation.

Other building automation information may be output, such as light control data, intercom control data, volume control data or combinations thereof. The output data is different for different functions. Where multiple controls are provided, different output data is output as a function of user interaction with different ones of the plurality of locations or graphics.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a thermostat of a building automation system, the thermostat being for controlling heating or air conditioning in a room of a building, an improvement comprising:
    a line of sight temperature sensor operable to remotely sense a temperature of a remote location within the room along a line of sight, the remote location within the room being spaced from the thermostat.

2. The improvement of claim 1 wherein the line of sight temperature sensor comprises an infrared temperature sensor.

3. The improvement of claim 1 further comprising:
    an adjustable device operable to direct the line of sight of the line of sight temperature sensor to different locations in the room.

4. The improvement of claim 1 further comprising:
    a processor operable to calculate an average of signals provided from the line of sight temperature sensor.

5. The improvement of claim 1 further comprising:
    an optical sensor operable to detect user interaction with a location spaced from the thermostat; and
    a processor operable to control the thermostat as a function of the temperature remotely sensed and detected user interaction with the location.

6. The improvement of claim 1 further comprising:
    a projector operable to project temperature related information onto a surface spaced from the thermostat.

7. A method for sensing temperature for automated building heating or air conditioning, the method comprising:
    remotely sensing a temperature at a remote location along a line of sight with a line of sight temperature sensor; and
    controlling heating or air conditioning in a building automatically as a function of the temperature remotely sensed.

8. The method of claim 7 wherein remotely sensing the temperature comprises remotely sensing the temperature of an object in a room of the building, the object spaced away from the line of sight temperature sensor.

9. The method of claim 7 wherein remotely sensing comprises remotely sensing at an infrared frequency.

10. The method of claim 7 wherein the line of sight temperature sensor is positioned in a ceiling of the building; further comprising:
    aiming the line of sight of the line of sight temperature sensor at an object in a room of the building.

11. The method of claim 7 wherein remotely sensing comprises combining information from a plurality of readings of the line of sight temperature sensor.

12. The method of claim 7 further comprising:
    sensing, with another sensor, user interaction with a location spaced from the other sensor; and
    controlling heating or air conditioning as a function of the temperature remotely sensed and the user interaction with the location.

13. The method of claim 7 further comprising:
    projecting temperature related information onto a surface spaced from the thermostat.

14. The method of claim 12 further comprising:
    projecting, with a projector, temperature related information onto a surface spaced from the thermostat;
    wherein the line of sight temperature sensor, the other sensor, and the projector are positioned in a same housing in a ceiling of a room of the building, the projecting comprising projecting a temperature onto the surface and an input graphic at the location, the sensing with the other sensor comprising sensing positioning of an object adjacent the input graphic, and the controlling comprising setting an operation point of a thermostat as a function of the positioning of the object adjacent the input graphic.

15. A user input device for building automation, the user input device comprising:
    a sensor operable to detect user interaction with a location spaced from the user input device; and
    a processor operable to determine input selection as a function of the detected user interaction with the location and operable to generate output data for building automation as a function of the input selection.

16. The user input device of claim 15 wherein the sensor comprises an image sensor and wherein the processor is operable to determine the input selection from placement of an appendage at the location.

17. The user input device of claim 15 wherein the sensor comprises a CCD or CMOS sensor.

18. The user input device of claim 15 wherein the output data comprises temperature set point data, light control data, intercom control data, volume control data or combinations thereof.

19. The user input device of claim 15 wherein the sensor is operable to detect user interaction with a plurality of locations including the location, and wherein the processor is operable to output different output data as a function of user interaction with different ones of the plurality of locations.

20. The user input device of claim 15 wherein the processor is operable to determine user authorization as a function of the input selection and operable to output the output data if authorized.

21. The user input device of claim 15 further comprising:
    a projector operable to project a graphic on or adjacent to the location, the graphic and the output data corresponding to a building automation function.

22. The user input device of claim 15 further comprising:
a line of sight temperature sensor operable to sense a temperature within a room and spaced from the line of sight temperature sensor;
wherein the output data comprises a temperature set point.

23. The user input device of claim 22 wherein the sensor and the line of sight temperature sensor are within a same housing.

24. A method for inputting information in building automation, the method comprising:
sensing, with a sensor, user interaction with a location spaced from the sensor;
determining input selection as a function of the sensed user interaction with the location; and
outputting output data for building automation as a function of the input selection.

25. The method of claim 24 wherein sensing comprises optically sensing with an optical sensor user positioning of an appendage adjacent or on the location; and
wherein outputting comprises outputting temperature set point data, light control data, intercom control data, volume control data or combinations thereof.

26. The method of claim 24 further comprising:
sensing, with the sensor, user interaction with a plurality of locations, including the location, spaced from the sensor on a substantially vertical surface;
wherein outputting comprises outputting different output data as a function of user interaction with different ones of the plurality of locations.

27. The method of claim 24 further comprising:
verifying user authorization as a function of the input selection.

28. The method of claim 24 further comprising:
projecting a graphic on or adjacent to the location, the graphic and the output data corresponding to a building automation function.

29. The method of claim 24 further comprising:
sensing a temperature within a room with line of sight temperature sensing;
wherein determining comprises determining the user interaction with the location corresponding to temperature setting; and
wherein outputting comprises outputting a temperature set point.

30. The method of claim 29 further comprising:
projecting a graphic on or adjacent to the location, the graphic and the output data corresponding to a building automation function
wherein the sensing of temperature, sensing of user interaction and the projecting are performed from a housing in a ceiling, the sensing of temperature being from an object in a line of sight in the room, the sensing of user interaction being sensing user interaction with the graphic, and the graphic being a temperature adjustment graphic adjacent to a temperature graphic.

* * * * *